(12) United States Patent
Ghosh et al.

(10) Patent No.: US 7,811,535 B2
(45) Date of Patent: Oct. 12, 2010

(54) PROCESS FOR THE PREPARATION OF MAGNESIA (MGO)

(75) Inventors: Pushpito Kumar Ghosh, Bhavnagar (IN); Himanshu Labhshanker Joshi, Bhavnagar (IN); Hasina Hajibhai Deraiya, Bhavnagar (IN); Maheshkumar Ramniklal Gandhi, Bhavnagar (IN); Rohit Harshadrai Dave, Bhavnagar (IN); Kaushik Jethalal Langalia, Bhavnagar (IN); Vadakke Puthoor Mohandas, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 43 days.

(21) Appl. No.: 12/400,512

(22) Filed: Mar. 9, 2009

(65) Prior Publication Data

US 2010/0172812 A1     Jul. 8, 2010

Related U.S. Application Data

(63) Continuation of application No. 11/375,246, filed on Mar. 15, 2006, now abandoned.

(30) Foreign Application Priority Data

Jan. 31, 2006   (IN) .......................... 258/DEL/2006

(51) Int. Cl.
*C01F 5/20*   (2006.01)
*C01F 11/28*   (2006.01)
*C01C 1/02*   (2006.01)

(52) U.S. Cl. ........................ 423/162; 423/155; 423/170; 423/178; 423/357; 423/497; 423/636

(58) Field of Classification Search ................. 423/635, 423/162, 170, 357, 497, 155, 158, 166, 157.4, 423/169, 171, 638, 639, 178
See application file for complete search history.

(56) References Cited

U.S. PATENT DOCUMENTS

| 3,690,844 A | 9/1972 | Neitzel et al. |
| 3,852,044 A | 12/1974 | Neitzel et al. |
| 4,693,872 A | 9/1987 | Nakaya et al. |
| 4,695,445 A | 9/1987 | Nakaya et al. |
| 4,698,379 A | 10/1987 | Nakaya et al. |

*Primary Examiner*—Stanley Silverman
*Assistant Examiner*—James Fiorito
(74) *Attorney, Agent, or Firm*—Sughrue Mion, PLLC

(57) ABSTRACT

The present invention provides an improved process for the preparation of MgO of high purity >99% from salt bitterns via intermediate formation of $Mg(OH)_2$ obtained from the reaction of $MgCl_2$ and lime, albeit indirectly, i.e., $MgCl_2$ is first reacted with $NH_3$ in aqueous medium and the slurry is then filtered with ease. The resultant $NH_4Cl$-containing filtrate is then treated with any lime, to regenerate $NH_3$ while the lime itself gets transformed into $CaCl_2$ that is used for desulphatation of bittern so as to recover carnallite and thereafter $MgCl_2$ of desired quality required in the present invention. The crude $Mg(OH)_2$ is dried and calcined directly to produce pure MgO, taking advantage of the fact that adhering impurities in the $Mg(OH)_2$ either volatilize away or get transformed into the desired product, i.e., MgO.

23 Claims, 2 Drawing Sheets

PROCESS FOR THE PREPARATION OF MAGNESIA (MGO)

This is a continuation of application Ser. No. 11/375,246 filed Mar. 15, 2006 now abandoned. The entire disclosure(s) of the prior application(s), application Ser. No. 11/375,246 is hereby incorporated by reference.

FIELD OF THE INVENTION

The present invention relates to an improved process for the preparation of magnesia (MgO). More particularly, the invention relates to an improved process for the preparation of MgO of high purity from $Mg(OH)_2$ without the need to wash $Mg(OH)_2$ or MgO.

BACKGROUND OF THE INVENTION

Magnesia is an important compound that finds application in various industries.

Magnesium oxide has the highest melting point of the moderately priced oxides and is therefore an important raw material for refractory bricks and other materials. It is the only material apart from $ZrO_2$ that can withstand long-term heating above 2000° C.

Reference may be made to Ullmann's Encyclpedia, $6^{th}$ Edition (electronic version) wherein it is stated that: "The increased demands made on refractory materials as a result of higher operating temperatures and shorter tap to tap times in metallurgical furnaces and reactors can only be met by pure, high-density magnesia sinters. Small quantities of "contaminants" are disadvantageous if they form low-melting eutectics with MgO (e.g., with CMS at 1485° C. or with $C_2F$ at 1200° C. because this leads to deterioration of mechanical properties (e.g., strength and volume stability) at high temperatures. High-quality sinters therefore have a low content of high-melting silicate phases (such as $C_2S$), a low $B_2O_3$ content, and a high degree of direct periclase—periclase contact (without intermediate silicate phases).

Magnesia bricks have a high heat storage capacity and a high thermal conductivity. They are used in efficient off-peak storage heaters. The heat generated by a heating element is transferred to the magnesia brick and increases its temperature. Thermal conductivity is increased by a high periclase content and a low porosity. The specific heat is only slightly lowered by $SiO_2$ and $Al_2O_3$, but is significantly lowered by CaO, $Cr_2O_3$, and $Fe_2O_3$. The bricks should not contain free CaO (risk of hydration) or crystal phases with different modifications.

MgO can be pressure hydrated to form $Mg(OH)_2$. It can also be converted into anhydrous $MgCl_2$ through the reaction of eq. 1 (*Electrolytic Production of Magnesium*, Kh. L. Strelets, Keter Publishing House Jerusalem Ltd., 1977, p 28)

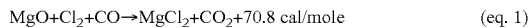
$MgO+Cl_2+CO \rightarrow MgCl_2+CO_2+70.8$ cal/mole (eq. 1)

and the anhydrous $MgCl_2$ can be converted into Mg and $Cl_2$ by electrolysis (eq.2).

$MgCl_2 \rightarrow Mg+Cl_2$ (eq.2).

Alternatively, MgO can be thermally reduced with Si to obtain Mg.

Reference is made to Ullmann's Encyclopedia wherein it is reported that magnesia can be prepared by the decomposition of magnesite ($MgCO_3$). The main drawback of this method is that magnesite ore can have high levels of impurity. The highest quality magnesites, particularly those for refractory applications, are needed for a magnesia product with a high MgO content, a $CaO:SiO_2$ mass ratio of 2-3, and low contents of $Fe_2O_3$ and $Al_2O_3$. The presence of accompanying, low-melting minerals can adversely affect the properties of the sintered magnesia.

Reference may also be made to a publication entitled "Magnesite—A market survey" published by Indian Bureau of Mines, Nagpur and "Magnesite" in Indian Minerals Year Book, Vol.-2 (1989) Published By Indian Bureau of Mines, Nagpur. Page-698 to 699, wherein magnesia is prepared by calcination of naturally occurring magnesite deposits. The drawback of this process is that magnesite ores contain varying amount of silica, iron oxide, alumina, and lime as silicates, carbonates, and oxides. Selectively mined ore is passed through various beneficiation methods like crushing and size separation, Heavy media separation, and froth flotation to reduce lime and silica content prior to calcination. Magnetic separation reduces iron concentration but is effective only when the iron is present in the form of discrete ferromagnetic minerals rather than as ferrous carbonate. Due to all this, high purity magnesia is difficult to produce by this process and most such magnesia has less than 95% purity.

Reference is made to the Sulmag II process (W. S. Ainscow: "Aufbereitung von Magnesit zu hochwertiger Sintermagnesia," *TIZ* 110 (1986) no. 6, 363-368. *Sulmag II the Sinter Magnesite Process*, Sulzer Brothers Ltd., Winterthur, Switzerland) for producing light-burned caustic magnesia in a gas suspension kiln from low-magnesite ores. Dissolved magnesium chloride is obtained by selective extraction with recycled $NH_4Cl$ solution (eqs. 3,4) and all insoluble impurities are removed through filtration. Needle-shaped crystals of nesquehonite ($MgCO_3.3H_2O$) are precipitated out in the reactor and filtered. Caustic magnesia with a high specific surface area is obtained by heating the nesquehonite.

$MgCO_3 \rightarrow MgO+CO_2$ (eq. 3)

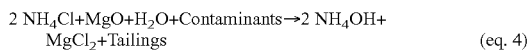
$2\ NH_4Cl+MgO+H_2O+Contaminants \rightarrow 2\ NH_4OH+MgCl_2+Tailings$ (eq. 4)

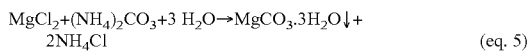
$MgCl_2+(NH_4)_2CO_3+3\ H_2O \rightarrow MgCO_3.3H_2O\downarrow +2NH_4Cl$ (eq. 5)

The process has not been applied for production of MgO via $Mg(OH)_2$ which would give magnesia of desired characteristics suitable for refractory applications whereas direct production from the nesquehonite would give product of very low bulk density.

Reference is made to the preparation of MgO from $Mg(OH)_2$ by calcination. Reference is also made to Kirk Othmer, Encyclopedia of Chemical Technology, $4^{th}$ Ed., Vol. 15, p 690 wherein it is stated that "To precipitate and recover magnesium hydroxide from solutions of magnesium salts, a strong base is added. The more commonly used base is calcium hydroxide derived from lime (CaO) or dolime (CaO—MgO). Sodium hydroxide is used as a precipitant if a product having low CaO content is desired.

$Mg(OH)_2 \rightarrow MgO+H_2O$ (eq. 6)

Reference may be made to the Paper entitled "Carbonation of Aqueous Suspensions containing Magnesium Oxides or Hydroxides" by Robert L. Evans and Hillary W. St. Clair in "Industrial and Engineering Chemistry" 1949, 41(12), 2814-2817, wherein a modification of the Pattinson process (carbonation of magnesium hydroxide to magnesium bicarbonate) is described. A suspension of magnesium hydroxide is carbonated to form a metastable solution of magnesium bicarbonate. After the separation of insoluble impurities, the solution is decarbonated by heating or aeration and the magnesium carbonate precipitates as trihydrate, the penta hydrate or the basic carbonate. The precipitate is recovered from the solution by filtration and converted to magnesium oxide by thermal decomposition. The main drawback of the process is that the process is very sensitive to the partial pressure of carbon dioxide and to the temperature. The stability of the metastable solution of magnesium bicarbonate decreases markedly as the temperature rises above normal room temperature. Moreover, the bulk density of the MgO would be too low for refractory applications.

Reference may be made to the paper "Chemical Engineering Problems in the Sea Water Magnesia Process" read by H. W. Thorp and W. C. Gilpin at a meeting of the chemical engineering group, held in the Apartment of the geological society, Burlington House, London, W. I. on Tuesday, Oct. 25, 1949 wherein the recovery of magnesia from sea water lies in the difficulty of precipitating the magnesium hydroxide in a form which will settle rapidly and which will yield a sludge easy to de-water. It is realized that each ton of magnesia must be separated from some 300 tons of water, which amount does not include any used for washing the precipitate. It is necessary to ensure the minimum contamination by lime; the sea water is treated prior to the removal of the magnesium hydroxide, with a small proportion of lime to precipitate the bicarbonate ion as calcium carbonate.

Reference is made to Ullmann's Encyclopedia wherein the production of MgO from seawater and brines is described. 470 m$^3$ of seawater are required to produce 1 t of MgO; in practice 600 m$^3$ are needed. The process is based on the precipitation of magnesium hydroxide (solubility in water 0.0009 wt %) by addition of calcium hydroxide (solubility 0.185 wt %):

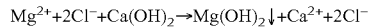

$$Mg^{2+}+2Cl^-+Ca(OH)_2 \rightarrow Mg(OH)_2\downarrow+Ca^{2+}+2Cl^-$$

The main drawbacks of the above process are that a supply of freshwater (>40 m$^3$ per tonne MgO) is required to wash the Mg(OH)$_2$ and to produce the milk of lime. High-purity limestone or dolomite deposits should be available in the vicinity; they are calcined and slaked to provide Ca(OH)$_2$ as the precipitating agent and should therefore contain minimal quantities of elements that form insoluble carbonates, sulfates, etc. The freshwater also requires to be decarbonated. Unless specially treated, caustic and sintered magnesia produced from seawater usually contain ca. 0.2% B$_2$O$_3$ and small amounts of CaO, SiO$_2$, Al$_2$O$_3$, and Fe$_2$O$_3$ derived from the limestone or wastes in the seawater. The B$_2$O$_3$ content of the magnesia is also generally lowered to ca. 0.05% by using a 5-12% excess of lime for precipitation (overliming); this increases the pH to 12 and minimizes the adsorption of boron.

Reference may also be made to the paper "Recovery of Magnesium Compounds from Sea Water" by W. C. Gilpin and N. Heasman" in "Chemistry and Industry", 6 Jul. 1977, 567-572, wherein the process of recovering magnesia from seawater and the problems with the process are clearly outlined. The drawbacks of the process are similar to those described above.

Reference may also be made to the technique of pyrohydrolysis. MgCl$_2$-rich brine is purified to remove bromide and traces of boron and then fed via steel pipes into the spray nozzles of the reactor. It is sprayed into the cylindrical, externally insulated reactor at ca. 600° C. The water evaporates from the atomized brine droplets leaving a perforated chloride crust which reacts with the steam to form MgO and HCl. The crude product is washed with water and hydrated in a stirred tank, and then concentrated in a thickener. The resulting slurry is difficult to filter and is washed and dewatered in a two-stage vacuum drum filter. The calcined product typically contains ≧99.5 wt % MgO, <1 wt % CaO, ≦0.05 wt % SiO$_2$, ≦0.05 wt % Fe$_2$O$_3$, ≦0.005 wt % Al$_2$O$_3$, and ≦0.01% B$_2$O$_3$; its specific surface area is 2-50 m$^2$/g, the loose bulk density ranges from 0.8 to 0.2 g/cm$^3$. The main drawback is that the spray calcined product needs to be washed to remove unreacted MgCl$_2$ and soluble salts and once again subjected to calcination. Spray calcination is an energy intensive process and choking up of nozzles can pose a problem. Reference may be made to the U.S. Pat. No. 4,255,399 Dated Mar. 10, 1981 entitled "Process for the Recovery of Magnesium Oxide of high Purity" by Grill et. al, wherein magnesium oxide is obtained by thermal decomposition of a magnesium chloride brine previously purified. Concentrated magnesium chloride is decomposed in a thermal reactor where hot gases convert it into magnesium oxide and hydrochloric acid. The problems no doubt would be similar to those stated above.

Reference is made to U.S. Pat. No. 6,776,972, DT. 17-08-2004 wherein Vohra et al. have described the use of HCl gas generated from spray pyrolysis for reaction with limestone to prepare CaCl$_2$ which can then be used to desulfate sea/subsoil bittern for the facile production of carnallite double salt wherefrom KCl can be produced. The problem of spray calcination, however, remains.

Reference may be made to "Encyclopedia of chemical Reactions" compiled and edited by C. A. Jacobson page No. 427, Reaction No. -IV-1757 and further reference may be made to "Encyclopedia of chemical Technology" third edition. Vol. 14, edited by Herman F. Mark et. al. page No. 624 wherein addition compounds with ammonia include MgCl$_2$.6NH$_3$, MgCl$_2$.2NH$_3$ and MgCl$_2$.NH$_3$ are obtained by the reaction between anhydrous MgCl$_2$ and NH$_3$ gas in a closed system. It will be evident that magnesium complexes only form under certain specific conditions only.

Reference may be made to a paper "Effect of pH on the Growth of Mg(OH)$_2$ Crystals in an Aqueous Environment at 60° C." by V. A. Phillips et. al. in " Journal of Crystal Growth" 41 (1977) 228-234 wherein magnesium hydroxide was precipitated at 60° C. at various constant pH levels in the range 8.7 to 12.5 from magnesium chloride and ammonium hydroxide. The results showed that the particle morphology, average diameter, diameter to thickness ratio and surface area varied with pH. No mention is made of any process of preparation of MgO from the hydroxide.

Reference may be made to "Preparation of magnesium hydroxide flame retardant by ammonia method." by Li, Kemin; Zhang, Li, Wujiyan Gongye, (33(2), 14-16 (Chinese) 2001 Wujiyan Gongye Bianjib; CA 135:115882; CA Section: 78 (Inorganic Chemicals and Reactions), wherein the flame retardant was prepared by allowing bittern after recycling K$_2$SO$_4$ to react with NH$_4$OH, hydrothermal treatment to obtain Mg(OH)$_2$, treating by surface treatment, washing, drying, and crushing. The content of Mg(OH)$_2$ of the flame retardant was 97%. No mention is made of any process that produces MgO from the crude unwashed Mg(OH)$_2$.

Reference may be made to "Recovery of magnesium hydroxide, gypsum and other products from natural and technical brines, in particular from final lyes of potash works." by Krupp, Ralf (Germany) (Ger. Offen. DE 10154004 A1 15 May 2003, 9 pp. (German).; CA 138:371080), wherein, recovery of Mg(OH)$_2$ and gypsum from MgSO$_4$— and MgCl$_2$-containing brines results by precipitation of Mg-ions with NH$_3$ or NH$_4$OH. Gaseous NH$_3$ is recovered by addn. of CaO and recycled for the pptn. step. The method allows the manufacture of Mg(OH)$_2$ without impurities such as Fe, Mn, Al, and Ca. However, although not stated explicitly, the preparation of pure Mg(OH)$_2$ would no doubt have involved the washing of the solid to remove adhering NH$_4$Cl, MgCl$_2$, etc. No mention is made of any process that produces MgO from the crude unwashed $Mg(OH)_2$.

Reference may be made to "One-step process for manufacture of magnesium hydroxide" by Wang, Fuwen; Zhang, Jun; Liu, Jianhua; Dong, Yijun (Shandong Haihua Group Corp., Ltd., Peop. Rep. China). Faming Zhuanli Shenqing Gongkai Shuomingshu CN 1332117 A 23 Jan. 2002, 7 pp. (Chinese). (People's Republic of China). Bittern containing $MgCl_2$ and ammonium hydroxide[mol ratio of $MgCl_2$/ammonia=1/(1.3-2.0)] are reacted at 45-90° for 5-30 min, filtered, washed, dried, and pulverized to give solid magnesium hydroxide. No mention is made of the preparation of MgO from the crude $Mg(OH)_2$.

Reference may be made to the paper by J. A. Fernandez-Lozano entitled "Utilization of Seawater Brines for the Production of High Purity Magnesium Oxide and Magnesium Hydroxide" published in the Proceedings of the Fifth International Symposium on Salt—Northern Ohio Geological Society, 1979, pp 269-279 wherein the author has stated that $Mg(OH)_2$ obtainable from the reaction of $MgCl_2$-rich seawater brine and ammonia can be made of high purity by washing the hydroxide and that, in principle, MgO of high purity can be obtained as a result. No mention is made of the possibility of obtaining high purity MgO directly from the crude hydroxide. Neither is there any mention of the recycle of ammonia to make the process economically viable.

OBJECTIVES OF THE INVENTION

The main object of the present invention is to provide an improved process for the preparation of magnesia from magnesium chloride via intermediate formation of magnesium hydroxide wherein no washing is required either of the magnesium hydroxide or of the magnesia while at the same time obtaining MgO of very high purity.

Yet another object of the present invention is to dispense with the tedious process of washing of magnesium hydroxide resorted to in the prior art.

Yet another object is to use aqueous ammonia in a reaction with magnesium chloride.

Yet another object is to drive the equilibrium-controlled reaction between magnesium chloride and ammonia to 85% formation of $Mg(OH)_2$ under ambient conditions, through use of a small excess of ammonia.

Yet another object is to recover the magnesium hydroxide precipitate thus formed by rapid filtration and subjecting the crude solid directly to calcination after drying.

Yet another object is to exploit the sublimation property of ammonium chloride to expel it during calcination and to obtain directly the magnesia of high purity.

Yet another object to simultaneously convert the adhering $MgCl_2$ into MgO and HCl vapor.

Yet another object is to recover the ammonium chloride and HCl vapors by absorbing these in the ammonium chloride/ammonia filtrate obtained from the magnesium hydroxide-forming reaction thereby increasing the ammonium chloride concentration.

Yet another object is to use of lime for the regeneration of ammonia.

Yet another object is to have a continuous process wherein the operations of magnesium hydroxide preparation, filtration, drying, calcination, and regeneration of ammonia are performed simultaneously to obtain the desired high purity yield of MgO and $CaCl_2$-rich liquor as by-product.

Yet another object is to utilize the by-product $CaCl_2$ liquor, with or without clarification, for desulphatation of raw bittern as described in the prior art, to facilitate crystallization of carnallite double salt and also to minimize sulphate impurity in end bittern.

Yet another object is to utilize the end bittern containing 440-480 gpl of $MgCl_2$, which is nearly free of other impurities, as a raw material directly for the preparation of MgO having 98% purity.

Yet another object is to obtain high yields MgO having purity 99% and very low $B_2O_3$ impurity directly upon calcination, useful for refractory applications.

Still another object is to produce high purity magnesium products such as milk of magnesia, magnesium metal, $Mg(OH)_2$ fire retardant, etc., utilizing the MgO of the present invention.

SUMMARY OF THE INVENTION

The aim of the present invention is directed to provide an improved process for the preparation of MgO of high purity from salt bitterns via intermediate formation of $Mg(OH)_2$ obtained from the reaction of $MgCl_2$ and lime, albeit indirectly, i.e., $MgCl_2$ is first reacted with NH3 in aqueous medium and the slurry is then filtered with ease. The resultant $NH_4Cl$-containing filtrate is then treated with any lime, preferably the most inexpensive lime, to regenerate NH3 while the lime itself gets transformed into $CaCl_2$ that is used for desulphatation of bittern so as to recover carnallite and thereafter $MgCl_2$ of desired quality required in the present invention. The crude $Mg(OH)_2$ is dried and calcined directly to produce pure MgO, taking advantage of the fact that adhering impurities in the $Mg(OH)_2$ either volatilize away or get transformed into the desired product, i.e, MgO.

DETAIL DESCRIPTION OF THE INVENTION

Figure 1:
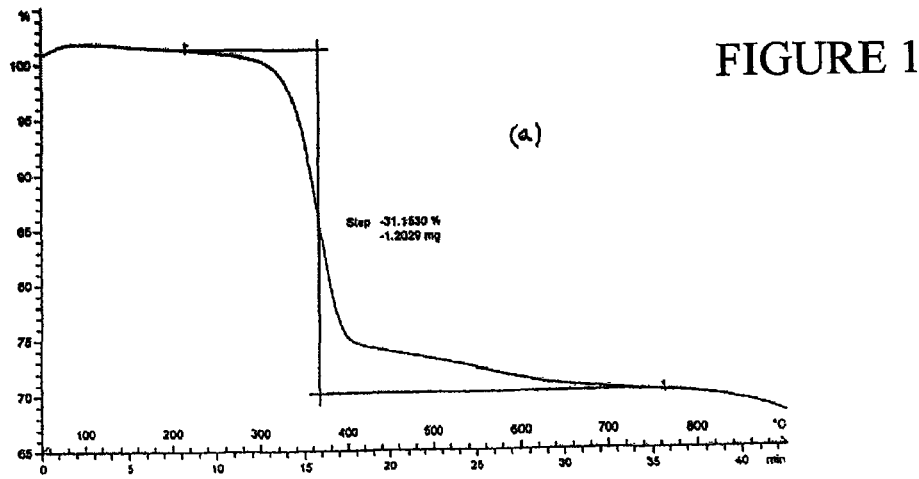
FIG. 1 shows thermograms of (a) $Mg(OH)_2$, (b) $MgCl_2 \cdot 6H_2O$ and (c) $NH_4Cl$.
Figure 1:
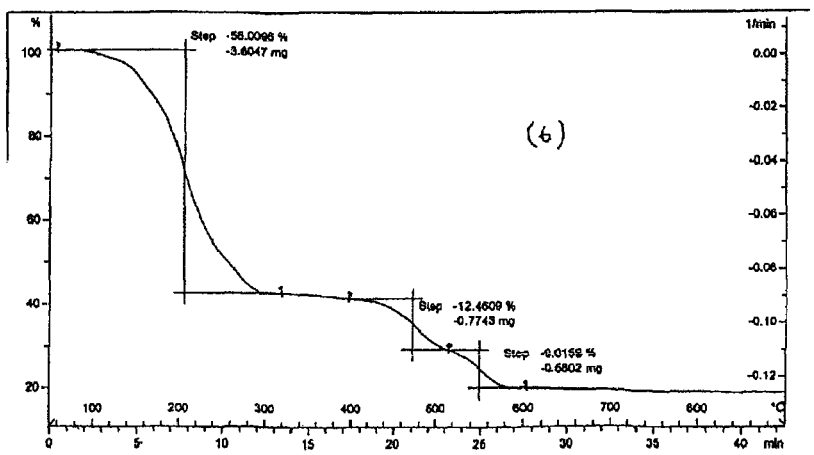
Figure 1:
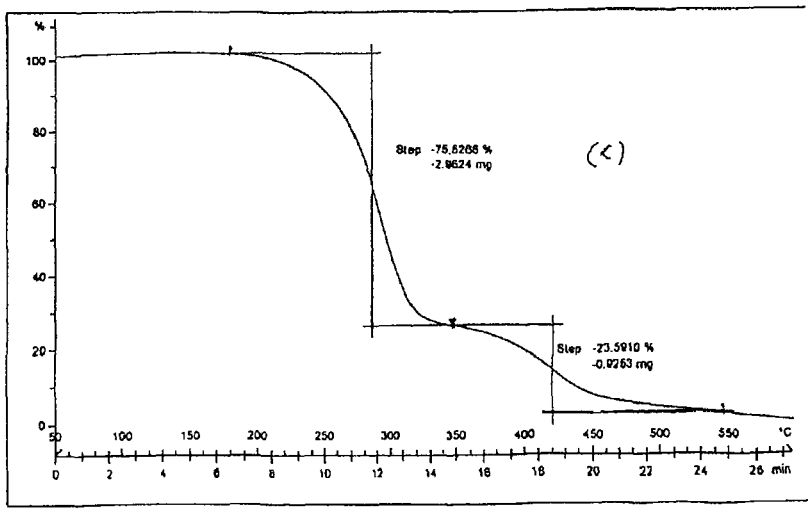

Accordingly, the present invention provides an improved process for the preparation of MgO, the said process comprising the steps of:
  i) desulphating brine or bittern with calcium chloride,
  ii) evaporating the clarified brine/bittern after separation of gypsum to separate out the common salt and camallite ($KCl \cdot MgCl_2 \cdot 6H_2O$),
  iii) recovering $MgCl_2$ rich and other salt free end bittern from step (ii),
  iv) further evaporating end bittern of step (iii) to obtain crystalline $MgCl_2 6H_2O$,
  v) seeding $MgCl_2 6H_2O$, obtained in step (iv) either as such or after recrystallization, in solid or solution form, with a small quantity of $Mg(OH)_2$ and treating it with ammonia ($NH_3$)
  vi) filtering the resultant slurry obtained in step (v) to obtain the crude $Mg(OH)_2$ and $NH_4Cl$/residual $NH_4OH$ filtrate,
  vii) drying the above crude $Mg(OH)_2$, followed by calcination to convert $Mg(OH)_2$ into MgO, and converting adhering $MgCl_2$ into MgO and HCl gas, and $NH_4Cl$ into sublimed vapor, viii) absorbing the hot sublimed vapor of $NH_4Cl$ generated in step (vii) from the calciner into the $NH_4Cl$/residual $NH_4OH$ filtrate of step (vi) to further enrich the filtrate in $NH_4Cl$ and also for heating up the filtrate, ix) treating the above said hot filtrate with lime to obtain $CaCl_2$ solution and ammonia vapor, x) using the ammonia vapor obtained in step (ix) in a process step (v) to complete the loop while using the by-product $CaCl_2$ solution in step (i).

In an embodiment of the present invention the bittern used in step (i) is obtained from ocean brine, sea brine, sub-soil brine or lake'brine.

In yet another embodiment the sulphate-containing bitterns used in step (i) are desulphated in the density range of 29-32° Be'.

In yet another embodiment the carnallite ($KCl.MgCl_2.6H_2O$) obtained in step (ii) is crystallized between 32-36°Be' either through solar or forced evaporation and the end bittern in step (iii) having density of 35.5-36.0°Be' contains 450-460 gpl of $MgCl_2$, 5-10 gpl of NaCl, 5-10 gpl of KCl, 5-15 gpl of Ca, 0-5 gpl of sulphate, 6-7 gpl $Br^-$, 0.03% $B_2O_3$.

In yet another embodiment the end bittern of step (iii) is preferably debrominated so as to recover bromine and simultaneously reduce the $Br^-$ impurity in debrominated bittern to <0.5 gpl.

In yet another embodiment the pristine end bittern of step (iii) is used for MgO recovery, preferably debrominated and used without crystallization of step (iv).

In yet another embodiment the end bittern of step (iii) is used with or without debromination and is evaporated as per the procedure of, step (iv) to reduce the volume by 20-25% to crystallize out the $MgCl_2.6H_2O$ in 60-80% yield containing 0.020-0.015% $B_2O_3$ impurity and is free from other salts.

In yet another embodiment the ammonia used for the initialization of reaction in step (v) is an aqueous ammonia solution containing 20-25% ammonia (w/w).

In yet another embodiment the mole ratio of $NH_3$ to $MgCl_2$ used in step (v) is in the range 0.5:1 to 2.0:1, preferably in the range 1.1:1 to 2.0:1 to obtain the residual $MgCl_2$ level in the filtrate of <1.5% and preferably <0.5%.

In yet another embodiment the filtration operation used in step (vi) is carried out with ease on a Nutsche filter or rotary disk filter or filter press.

In yet another embodiment the filtration operation used in step (vi) is carried out in a centrifuge.

In yet another embodiment the drying and calcination operation used in step (vii) is carried out directly or alternatively after washing the crude $Mg(OH)_2$ with a minimum quantity of water and additives to remove apart of the adhering impurities and rest during calcination.

In yet another embodiment the drying operation used in step (vii) is carried out at a temperature of 70-15.0° C. in either a conventional oven or a solar oven to yield soft white lumps that crumble easily into a powder.

In yet another embodiment the calcination operation used in step (vii) is carried out in a muffle furnace at a temperature of about 900° C. for 2-3 h and preferably by gradually ramping the temperature to expel adhering $NH_4Cl$, HCl (from adhering $MgCl_2.6H_2O$), $H_2O$ and $NH_3$ (from adhering $NH_4OH$) at a temperature 600° C., to yield MgO of high purity.

In yet another embodiment the MgO obtained in step (vii) has a purity of 98.0-98.9% when produced directly from the end bittern of step (iii) and a purity in the range of 99.1-99.7 when prepared from crystallized or recrystallized $MgCl_2.6H_2O$ obtained in step (iv).

In yet another embodiment the MgO obtained from end bittern of step (iii) has a $B_2O_3$ impurity level in the range of 0.10-0.12%.

In yet another embodiment the MgO obtained from crystallized $MgCl_2.6H_2O$ of step (iv) has a $B_2O_3$ impurity level in the range of 0.060-0.080%.

In yet another embodiment the MgO obtained from recrystallized $MgCl_2.6H_2O$ has a $B_2O_3$ impurity level in the range of 0.010-0.015%.

In yet another embodiment the $B_2O_3$ level in MgO can be made still lower through appropriate treatment either of the precursor $Mg(OH)_2$ or of the MgO itself.

In yet another embodiment the $NH_4Cl/NH_4OH$ filtrate obtained as by-product of $Mg(OH)_2$ preparation in step (vi) contains 0.5-2.0% Mg and preferably, 0.5-1.0% Mg, to minimize the formation of $Mg(OH)_2$ during treatment with lime.

In yet another embodiment the lime used in step (ix) is either hydrated lime or quicklime in the form of a solid or solid suspension.

In yet another embodiment the $NH_3$ vapors generated in step (ix) is stripped out with air or steam and is absorbed in a solution of $MgCl_2$ by feeding into the reaction chamber at a rate so as to maintain the desired mole ratio of $NH_3$ to $MgCl_2$ for optimum reaction.

In still another embodiment the solution obtained in step (ix) contains 20-30% $CaCl_2$ and, is used directly in desulphatation reaction in step (i) or is clarified through filtration and/or addition of acid to redissolve $Mg(OH)_2$ prior to executing in step (i).

The inventive step of the present invention lies in the preparation of magnesia from magnesium chloride via intermediate formation of magnesium hydroxide wherein no washing is required either of the magnesium hydroxide or of the magnesia while at the same time obtaining MgO of very high purity.

The Important Features of the Present Invention are:

(1) Recognising that MgO production from $Mg(OH)_2$ via the conventional process of treatment with lime or caustic soda suffers from the drawback of poor filterability and requirement of large quantity of fresh water for repeated washing, and that when lime is used because of its lower cost, insoluble matter in the lime such as silica, $CaCO_3$, etc., can contaminate the $Mg(OH)_2$ and, consequently, the MgO derived from $Mg(OH)_2$ by calcination.

(2) Reasoning thereafter that, where MgO is the required product, it may be possible to devise a scheme to obtain MgO in pure form without, as such, spending effort in the purification of $Mg(OH)_2$, (3) Conceptualising thereafter that it would be desirable to devise a scheme whereby in a single calcination operation $Mg(OH)_2$ is converted into MgO and simultaneously the product is "self-purified" by eliminating undesired impurities.

(4) Recognising that $Mg(OH)_2$ formation from the reaction of $MgCl_2$-rich end bittern—which is almost free of other impurities-and $NH_3$ would fit in well with the proposed scheme of (3) above since adhering $NH_3$ to product would be driven out, adhering $NH_4Cl$ would sublime away, and adhering $MgCl_2$ will also simultaneously convert into MgO while HCl gas would be driven away under the calcination condition as it is evident from the thermograms of FIG. 1.

(5) Recognising that, since $NH_4Cl$ is highly soluble in water, the hot sublimed $NH_4Cl$ can be absorbed into $NH_4Cl$-containing filtrate obtained in (4) above to raise the $NH_4Cl$ concentration of the solution and also its temperature. Recognising further that released HCl, NH₃ and water from (4) above would also get absorbed in the same filtrate.

(6) Recognising that the ammonia recovery step of the Solvay Process can be adopted to liberate NH₃ from aqueous NH₄Cl through reaction with any inexpensive lime and the liberated NH₃ can be recycled by directly absorbing it into aqueous MgCl₂ to produce Mg(OH)₂ once again.

(7) Recognising that the concentrated NH₄Cl solution obtained above would get converted into a CaCl₂ solution during the reaction with lime and this solution can be filtered to remove insoluble matter, or clarified in other ways, to yield a clear concentrated CaCl₂ solution that is fit for use (8) Recognising that the CaCl₂ solution can be used to desulphate sea bittern and the resultant bittern, after separation of gypsum, can be evaporated to crystallize out carnallite (from which MOP can be recovered) leaving end bittern rich in MgCl₂ and free of other impurities, as reported in the prior art.

(9) The process of the invention dispenses with the need for any water for washing and enables the overall desired reaction:

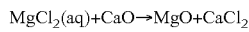

MgCl₂(aq)+CaO→MgO+CaCl₂ to be achieved indirectly as follows:

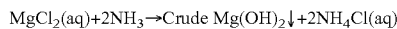

MgCl₂(aq)+2NH₃→Crude Mg(OH)₂↓+2NH₄Cl(aq)

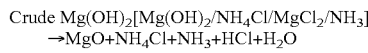

Crude Mg(OH)₂[Mg(OH)₂/NH₄Cl/MgCl₂/NH₃]
→MgO+NH₄Cl+NH₃+HCl+H₂O

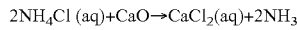

2NH₄Cl (aq)+CaO→CaCl₂(aq)+2NH₃ with great practical consequences in terms of (a) ease of processing, (b) elimination of requirement of any fresh water for washing, (c) utilization of inexpensive CaO as the consumable base for Mg(OH)₂ production, (d) preparation of MgO with 98% purity without any washing operation, and (e) utilizing by-product CaCl₂ for desulphatation of bittern so as to obtain muriate of potash (via carnallite) and end bittern containing nearly pure MgCl₂ that is used directly for Mg(OH)₂ preparation or evaporated further to obtain MgCl₂.6H₂O.

The following examples are given by the way of illustration and therefore should not be construed to limit the scope of the invention.

EXAMPLE-1

200 g of MgCl₂.6H₂O (0.985 moles) was reacted with 75.53 g of NaOH (1.890 moles). The residue obtained on filtration was washed with water. The mass of the wet cake was 270.65 g.

Of this 235.34 g was dried at 110° C. to obtain 77.98 g of dry residue. 60 g of this dry residue was calcined to obtain 22.55 g MgO having >99% purity. The loss on ignition was 62.42% (theoretical LOI=30.88%). The observations from this example are that, even though MgO of high purity is obtainable, this is achieved only through elaborate and tedious washing.

EXAMPLE-2

250 g of MgCl₂.6H₂O (1.232 moles) was reacted with 190.8 g of 23.8% (w/w) ammonia solution (2.671 moles) and the slurry was stirred for 15 min and then filtered. Filtration was found to be very facile. The residue was washed with 280 mL of pure water to obtain 152 g wet cake which, on drying at 110° C. yielded a weight of 43.40 g. Of this, 31.83 g was calcined at 900° C. to give 21.13 g of MgO (58.46% yield w.r.t. MgCl₂) having >99.31% purity. The loss on ignition was 33.71% (theoretical LOI=30.88%) indicating that the dried material prior to calcination was essentially pure Mg(OH)₂. This example establishes that no complexed form of ammonia exists in the product mixture and that all impurities are therefore of adhering nature. These are expected to be MgCl₂, NH₃ and NH₄Cl besides some minor impurities, if any, which may be present in the solid MgCl₂.6H₂O. It will be further evident that the major adhering impurities would either be converted into MgO or volatilize away on calcination and, therefore, if the Mg(OH)₂ is not thoroughly washed; indeed, even if it is not washed at all, the MgO that can be expected to be obtained of high purity.

EXAMPLE 3

Figure 2:
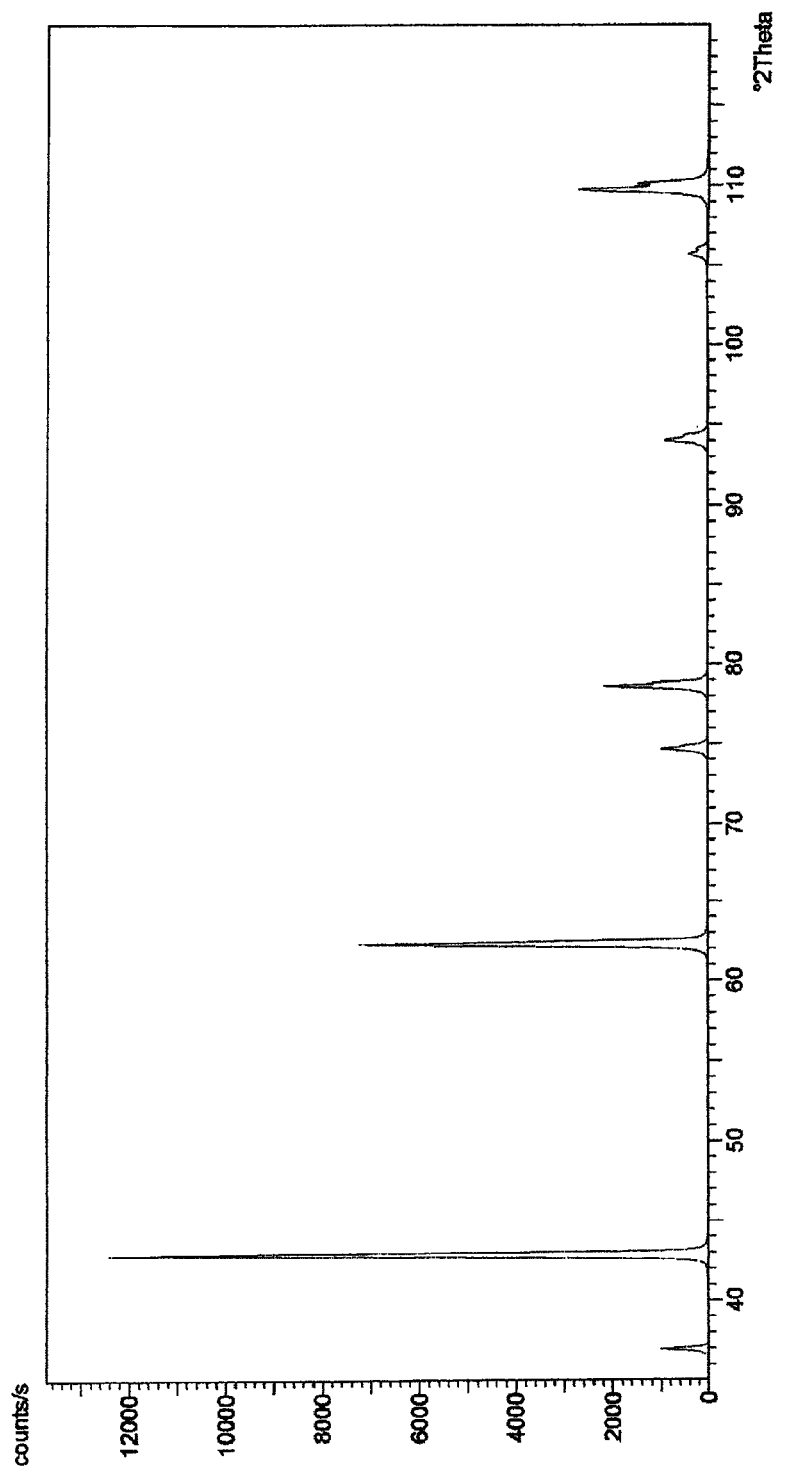
FIG. 2 shows X-ray powder diffractogram of MgO of 99.35% purity produced by the process of the present invention (Example 3) without washing of either $Mg(OH)_2$ or MgO.

100 gm of MgCl₂.6H₂O (AR grade) (0.493 moles) having available MgCl₂ content of 46.8 gm was mixed under stirring with 73.44 ml (NH₃=23.84% w/w; sp. Gr. 0.91)) of ammonia liquor (0.937 moles) of specific gravity 0.91. The mixture was allowed to stand for two hours. The resultant slurry could be readily filtered by vacuum filtration. Wet cake weighing 51.5 gms and 92 ml of filtrate having specific gravity of 1.12 and chemical composition Ca=ND %, Mg=2.68%, Cl=20.38% was obtained. The wet cake was washed with 50 ml water. The wash filtrate composition is, Ca=ND, Mg=0.83%, Cl=5.44%. The cake was dried at 110 C to obtain dry mass of 43.43 gm which was further calcined at 900 C to obtain 13.78 gm (0.344 moles; 70% yield) of MgO showing purity of 99.35% , CaO=ND and Cl=0.37% and B₂O₃=0.012%. It will be evident from this example and the powder XRD of FIG. 2 that MgO purity matching that of Example 1 is obtainable if the MgCl₂ taken is free of impurity salts as is the case when AR grade MgCl.6H₂O is used. It will be evident from this example that the contention in Example 2 that good quality MgO can be obtained even without any washing of the Mg(OH)₂ is borne out by the result obtained.

EXAMPLE-4

200 ml (0.958 moles of MgCl₂) of end bittern having specific gravity of 1.324 and chemical composition Ca=0.504% (w/v), Mg=11.50%, SO₄=ND, Na=0.41%, K=0.4%, B₂O₃=0.032, was mixed under stirring with 123.8 gm solution of ammonia liquor of specific gravity 0.91 having ammonia content as NH₃=23.84%, i.e., 1.736 moles NH₃. The mixture was allowed to stand for seven hours. The resultant slurry was filtered by vacuum filtration. Wet cake weighing 109.52 gms and 242 ml of filtrate having specific gravity of 1.12 and chemical composition Ca=0.40%, Mg=2.75%, Cl=20.74% was obtained. The wet cake was dried and calcined at 900 C to obtain 23 gm (0.575 moles; 66.24% yield w.r.t. NH₃) MgO showing purity of 98.5%, CaO=0.99%, Cl=0.7% and B₂O₃=0.106%. It will be evident from this example that the contention in Example 2 that MgO of very good quality can be obtained without any washing of the Mg(OH)₂ holds even when end bittern of the quality described above is used. Nevertheless, the purity of the MgO is somewhat lower than achieved with washed Mg(OH)₂ obtained through NaOH precipitation following the conventional process of Example 1. As will be shown in an example below, bittern of this quality is obtainable by desulphatation of the raw bittern'using $CaCl_2$ generated in the process of the invention.

EXAMPLE-5

1 L of bittern of Example 4 was partially evaporated by forced evaporation to reduce its volume to 800 ml. The resultant mass was cooled to room temperature followed by filtration to obtain 619.7 gm crystalline magnesium chloride having chemical composition, Ca=0.22%, Mg=11.17%, $B_2O_3$=0.0147% and 370 ml of filtrate having specific gravity 1.338 and $B_2O_3$=0.0657%, 500 gm (2.327 moles) of this magnesium chloride was mixed with 5 gm (0.08 moles) seeds of $Mg(OH)_2$ along with 400 ml of solution of ammonia having $NH_3$ concentration of 23.84% (w/w) (5.104 moles) The mixture was allowed to stand for 2 hours. The slurry was vacuum filtered to obtain 283.56 gm wet cake and 512.00 ml of filtrate containing ammonium chloride having specific gravity 1.08 and Ca=0.12%, Mg=1.54%. The cake was dried and calcined at 900 C to obtain 80.5 gm (2.012 moles; 86.48%) of MgO having MgO content of 99.09%, CaO=0.38% and Cl=0.23%. This example teaches us that the $MgCl_2$-rich end bittern of Example 4 can be used for the preparation of $MgCl_2.6H_2O$ that can yield MgO of >99% purity . and containing only 0.0737% $B_2O_3$ even without any manner of washing either of the $Mg(OH)_2$ or of the MgO. It would be evident that recrystallization of $MgCl_2.6H_2O$ would further improve the purity of MgO.

EXAMPLE-6

9.543 g of the MgO of Example 3 was subjected to simple water wash and re-calcined to yield 9.371 g of purified MgO wherein the Cl impurity was absent, the $B_2O_3$ impurity was lowered from 0.0121% to 0.0061%, and the MgO purity improved from 99.3% to 99.7%. The present example gives an indication of the feasibility of making MgO of exceptional purity if such purity were to be required for highly demanding applications.

EXAMPLE-7

100 ml of the filtrate containing ammonium chloride and having specific gravity of 1.08 obtained in Example-5 above was mixed with 32 gm of hydrated lime [$Ca(OH)_2$=89.90%] on a water bath. The contents were heated to expel ammonia generated from the reaction of lime and ammonium chloride. The ammonia generated was allowed to absorb in 200 ml of end bittern of Example-4. The mixture from the lime still for ammonia and calcium chloride generator was filtered to obtain 99 ml of calcium chloride liquor having $CaCl_2$ content of 24.51% and Mg content of 0.12%. The slurry containing magnesium hydroxide prepared by absorption of ammonia was filtered and dried at 110° C. to obtain 12.00 g of solid which on calcination at 900 C gave 4.66 gm of MgO (54% yield w.r.t. $CaCl_2$ generated and, consequently, $NH_3$ generated) and having MgO purity of 98.9%. This example teaches us the recycle of ammonia for $Mg(OH)_2$ production, with concomitant generation of calcium chloride useful for desulphatation of bittern.

ADVANTAGES OF THE PRESENT INVENTION

The main advantage of the present invention:is that $Mg(OH)_2$ obtained from the reaction of $MgCl_2$ and ammonia in aqueous medium, which is very easy to filter, requires no further purification and can directly yield MgO of high purity, thereby largely eliminating the tedious nature of work up encountered in the conventional process of preparation of MgO from purified $Mg(OH)_2$.

Another advantage is the conservation of fresh water which is a scarce commodity in some of the regions where production of MgO from bittern, integrated with recovery of other marine chemicals, is intended.

Yet another advantage is that the quality of MgO obtained from the present invention surpasses, in many cases, the quality of MgO obtained from $Mg(OH)_2$ prepared following the conventional process as described in the prior art.

Yet another advantage is that the process of the present invention also compares favorably opposite other methods of producing MgO, such as through pyrohydrolysis of $MgCl_2$ and decomposition of magnesium carbonate. In the former case, two calcination steps along with a difficult washing step are involved, besides the operational complexity, whereas in the latter case, the MgO obtained is either too impure or suffers from the problem of low bulk density that makes it unsuitable for refractory applications.

Yet another advantage is that the easier work up and improved product quality—over that realized with the conventional process involving $MgCl_2$ and lime—are not at the expense of higher raw material cost since the net reaction is still the same, i.e., $MgCl_2$ and lime are the consumable raw materials while MgO and $CaCl_2$ are the products.

still another advantage is that not only is lime the cheapest base but the $CaCl_2$ generated as co-product from the reaction of lime and intermediate $NH_4Cl$ is useful in desulfating sea bittern that yields $MgCl_2$ of desired quality required for MgO production by the process of the present invention, besides also enabling the production of KCl through carnallite formation.

We claim:

1. An improved process for the preparation of MgO, the said process comprising the steps of:
   i) desulphating brine or bittern with calcium chloride,
   ii) evaporating the clarified brine/bittern after separation of gypsum to separate out the common salt and carnallite ($KCl.MGCl_2.6H_2O$),
   iii) recovering $MGCl_2$ rich and other salt free end bittern from step (ii),
   iv) further evaporating end bittern of step (iii) to obtain crystalline $MGCl_2.6H_2O$),
   v) seeding $MGCl_2.6H_2O$, obtained in step (iv) either as such or after recrystallization, in solid or solution form, with $Mg(OH)_2$ and treating it with ammonia ($NH_3$),
   vi) filtering the resultant slurry obtained in step (v) to obtain the crude $Mg(OH)_2$ and $NH_4Cl$/residual $NH_4OH$ filtrate,
   vii) drying the above crude $Mg(OH)_2$, followed by calcination to convert $Mg(OH)_2$ into MgO, and converting adhering $MGCl_2$ into MgO and HCl gas, and $NH_4C1$ into sublimed vapor,
   viii) absorbing the hot sublimed vapor of $NH_4Cl$ generated in step (vii) from the calciner into the $NH_4C1$/residual $NH_4OH$ filtrate of step (vi) to further enrich the filtrate in $NH_4Cl$ and also for heating up the filtrate,
   ix) treating the above said hot filtrate with lime to obtain $CaCl_2$ solution and ammonia vapor,
   x) using the ammonia vapor obtained in step (ix) in a process step (v) to complete the loop while using the by-product $CaCl_2$ solution in step (i).

2. An improved process as claimed in claim 1 wherein the bittern used in step (i) is obtained from ocean brine, sea brine, sub-soil brine or lake brine.

3. An improved process as claimed in claim 1, wherein the sulphate-containing bitterns used in step (i) are desulphated in the density range of 29-32° Be'.

4. An improved process as claimed in claim 1, wherein the carnallite ($KCl.MGCl_2.6H_2O$) obtained in step (ii) is crystallized between 32-36° Be' either through solar or forced evaporation and the end bittern of step (iii) having density of 35.5-36.0° Be' contains 450-460 gpl of $MGCl_2$, 5-10 gpl of NaCl, 5-10gpl of KCl, 5-15 gpl of Ca, 0-5 gpl of sulphate, 6-7 gpl $Br^-$, 0.03% $B_2O_3$.

5. An improved process as claimed in claim 1, wherein the end bittern of step (iii) is preferably debrominated so as to recover bromine and simultaneously reduce the $Br^-$ impurity in debrominated bittern to <0.5 gpl.

6. An improved process as claimed in claim 1, wherein the pristine end bittern of step (iii) is used for MgO recovery, preferably debrominated and used without crystallization of step (iv).

7. An improved process as claimed in claim 1, wherein the end bittern of step (iii) is used with or without debromination and is evaporated as per the procedure of step (iv) to reduce the volume by 20-25% to crystallize out the $MGCl_2.6H_2O$ in 60-80% yield containing 0.020-0.015% $B_2O_3$ impurity and is free from other salts.

8. An improved process as claimed in claim 1, wherein the ammonia used for the initialization of reaction in step (v) is an aqueous ammonia solution containing 20-25% ammonia (w/w).

9. An improved process as claimed in claim 1, wherein the mole ratio of $NH_3$ to $MGCl_2$ used in step (v) is in the range 0.5:1 to 2.0:1, preferably in the range 1.1:1 to 2.0:1 to obtain the residual $MGCl_2$ level in the filtrate of <1.5% and preferably <0.5%.

10. An improved process as claimed in claim 1, wherein the filtration operation used in step (vi) is carried out with ease on a Nutsche filter or rotary disk filter or filter press.

11. An improved process as claimed in claim 1, wherein the filtration operation used in step (vi) is carried out in a centrifuge.

12. An improved process as claimed in claim 1, wherein the drying and calcination operation used in step (vii) is carried out directly or alternatively after washing the crude $Mg(OH)_2$ with a minimum quantity of water and additives to remove a part of the adhering impurities and rest during calcination.

13. An improved process as claimed in claim 1, wherein the drying operation used in step (vii) is carried out at a temperature of 70-150 °C. in either a conventional oven or a solar oven to yield soft white lumps that crumble easily into a powder.

14. An improved process as claimed in claim 1, wherein the calcination operation used in step (vii) is carried out in a muffle furnace at a temperature of about 900° C. for 2-3 h and preferably by gradually ramping the temperature to expel adhering $NH_4Cl$, HCl (from adhering $MGCl_2.6H_2O$), $H_2O$ and $NH_3$ (from adhering $NH_4OH$) at a temperature 600° C., to yield MgO of high purity.

15. An improved process as claimed in claim 1, wherein the MgO obtained in step (vii) has a purity of 98.0-98.9% when produced directly from the end bittern of step (iii) and a purity in the range of 99.1-99.7 when prepared from crystallized or recrystallized $MGCl_2.6H_2O$ obtained in step (iv).

16. An improved process as claimed in claim 1, wherein the MgO obtained from end bittern of step (iii) has a $B_2O_3$ impurity level in the range of 0.10-0.12%.

17. An improved process as claimed in claim 1, wherein the MgO obtained from crystallized $MGCl_2.6H_2O$ of step (iv) has a $B_2O_3$ impurity level in the range of 0.060-0.080%.

18. An improved process as claimed in claim 1, wherein the MgO obtained from recrystallized $MGCl_2.6H_2O$ has a $B_2O_3$ impurity level in the range of 0.010-0.015%.

19. An improved process as claimed in claim 1, wherein the $B_2O_3$ level in MgO can be made still lower through appropriate treatment either of the precursor $Mg(OH)_2$ or of the MgO itself.

20. An improved process as claimed in claim 1, wherein the $NH_4Cl/NH_4OH$ filtrate obtained as by-product of $Mg(OH)_2$ preparation in step (vi) contains 0.52.0% Mg and preferably, 0.5-1.0% Mg to minimize the formation of $Mg(OH)_2$ during treatment with lime.

21. An improved process as claimed in claim 1, wherein the lime used in step (ix) is either hydrated lime or quicklime in the form of a solid or solid suspension.

22. An improved process as claimed in claim 1, wherein the $NH_3$ vapors generated in step (ix) is stripped out with air or steam and is absorbed in a solution of $MgCl_2$ by feeding into the reaction chamber at a rate so as to maintain the desired mole ratio of $NH_3$ to $MGCl_2$ for optimum reaction.

23. An improved process as claimed in claim 1, wherein the solution obtained in step (ix) contains 20-30% $CaCl_2$ and is used directly in desulphatation reaction in step (i) or is clarified through filtration and/or addition of acid to redissolve $Mg(OH)_2$ prior to executing in step (i).

* * * * *